US012591569B2

(12) United States Patent
Wolff et al.

(10) Patent No.: US 12,591,569 B2
(45) Date of Patent: ***Mar. 31, 2026

(54) METHODS AND SYSTEMS FOR GENERATING ELECTRONIC COMMUNICATIONS FEATURING CONSISTENT DATA STRUCTURING AND DYNAMICALLY-DETERMINED DATA CONTENT FOR END-USER SPECIFIC DATA IN ENVIRONMENTS WITH DATA STORAGE CONSTRAINTS

(71) Applicant: THE BANK OF NEW YORK MELLON, New York, NY (US)

(72) Inventors: John Wolff, New York, NY (US); Ruiyi Zhu, New York, NY (US); Marc Riva, New York, NY (US); Natasha Horn, Mullica Hill, NJ (US); Vasanthi Bheemavarapu, Monmouth Junction, NJ (US); Robert Costantino, Pennington, NJ (US)

(73) Assignee: THE BANK OF NEW YORK MELLON, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/758,281

(22) Filed: Jun. 28, 2024

(65) Prior Publication Data

US 2024/0354298 A1 Oct. 24, 2024

Related U.S. Application Data

(63) Continuation of application No. 17/206,404, filed on Mar. 19, 2021, now Pat. No. 12,056,118.

(51) Int. Cl.
*G06F 16/242* (2019.01)
*G06F 9/54* (2006.01)
(Continued)

(52) U.S. Cl.
CPC .......... *G06F 16/2445* (2019.01); *G06F 9/541* (2013.01); *G06F 16/2282* (2019.01); *G06F 16/24573* (2019.01)

(58) Field of Classification Search
CPC ........... G06F 16/2445; G06F 16/24573; G06F 16/2282; G06F 9/541
See application file for complete search history.

(56) References Cited

U.S. PATENT DOCUMENTS

2020/0363939 A1* 11/2020 Fitzgerald ........... G06F 3/04845
2021/0279115 A1* 9/2021 Aspro ....................... G06F 8/30

OTHER PUBLICATIONS

Extended European Search Report dated Aug. 12, 2022, issued in corresponding European Patent Application No. 22162812.6 (12 pgs.).

(Continued)

*Primary Examiner* — Khanh B Pham
*Assistant Examiner* — Ranjit P Doraiswamy
(74) *Attorney, Agent, or Firm* — Pillsbury Winthrop Shaw Pittman, LLP

(57) ABSTRACT

The methods and systems for improving communication distribution. In particular, the methods and systems for improving communication distribution in environments where there is both the need for end-user specific data (e.g., customized content) and/or data storage constraints. For example, in order to address the security/privacy concerns during communication distribution, the methods and systems use a novel architecture that limits the amount of data that must be stored. Specifically, the system does not require permanent storage of communications featuring end-user specific data prior to the distribution of these communications. Accordingly, the storage requirements are greatly diminished, and privacy/security concerns are avoided.

20 Claims, 8 Drawing Sheets

500

Receive a component selection — 502

Receive a data structure characteristic for the first component — 504

Receive a data content characteristic for the first component — 506

Receive request to generate a communication — 508

Populate the component — 510

Transmit a communication featuring the populated component — 512

(51) Int. Cl.
    *G06F 16/22*       (2019.01)
    *G06F 16/2457*    (2019.01)

(56)               References Cited

OTHER PUBLICATIONS

Anonymous, "Reporting in JIRA—JIRA Atlassian Documentation", Jan. 18, 2021,pp. 1-20, Retrieved from the Internet: https://web.archive.org/web/20210118163435/https://confluence.atlassian.com/jirakb/reporting-in-jira-461504615.html [retrieved on Aug. 4, 2022].

* cited by examiner

<u>100</u>

| CLIENTS | REPORTS | SETTINGS | DATA TOOLS | EXTERNAL LINKS |

CLIENT REPORTS     BATCH JOBS     REPORT BUILDER

ORIENTATION  LANDSCAPE ▼     A+                    Preview  Save  Cancel

PORTFOLIO RETURN  102

PORTFOLIO VALUE

ACCOUNT PERFORMANCE

ASSET CATEGORY

GAIN/LOSS

104

LOGO     ENTER REPORT NAME     Prepared for: Sample Investor
         Combined Account Portfolio

+ADD SECTION

CLIENTS  REPORTS  SETTINGS  DATA TOOLS  EXTERNAL LINKS

+ADD SECTION

| ↑ ↓ | X

/ X

Firm Default-All Accounts    As of MM/DD/YY

| Firm Default | Value(s) | (%) |
|---|---|---|
| ☐Asset Classification 1 | 999,999,999 | 99.99 |
| ☐Asset Classification 2 | 999,999,999 | 99.99 |
| ☐Asset Classification 3 | 999,999,999 | 99.99 |
| ☐Asset Classification 4 | 999,999,999 | 99.99 |

CUSTOMIZE - ASSET ALLOCATION     X

⚠ Component width within the report is too small to support other orientations. Please increase the width to support addidtional orientation options.

Report Orientation: Landscape     Font Size: Default

Classification FIRM DEFAULT ▼   Name FIRM DEFAULT   Account Segments ACCOUNT SEGMENTS Layout VERTICAL ▼    SHOW UP TO 6 ASSET CLASSIFICATIONS ▼

❶ The data is for illustration purposes only and will be rendered at run time.

Firm Default-All Accounts     As of MM/DD/YY

| Firm Default | Value(s) | (%) |
|---|---|---|
| ☐ Asset Classification 1 | 999,999,999 | 99.99 |
| ☐ Asset Classification 2 | 999,999,999 | 99.99 |

Reset   Apply   Cancel

CUSTOMIZE - PORTFOLIO RETURN                                                  X

Report Orientation: Landscape    Font Size: Default

Name PORTFOLIO RETURN                    □ SHOW CONTRIBUTION AND CHANGE DETAILS

ROWS ▾  COLUMNS ▾

⊙ The data is for illustration only and will be rendered
   at run time.

PORTFOLIO RETURN

| | Selected Period ($) | Quarter to Date ($) | Year to D |
|---|---|---|---|
| Beginning Value | 999,999,999 | 999,999,999 | 999,999,9 |
| Net Contribution | 999,999,999 | 999,999,999 | 999,999,9 |
| Change in Value | 999,999,999 | 999,999,999 | 999,999,9 |
| Ending Value | 999,999,999 | 999,999,999 | 999,999,9 |
| Return | 999,999,999 | 999,999,999 | 999,999,9 |
| Benchmark 1 | 99.99% | 99.99% | 99.99% |
| Benchmark 2 | 99.99% | 99.99% | 99.99% |

⠿ ☑ BEGINNING VALUE ↑↓
⠿ ☑ NET CONTRIBUTION ↑↓
⠿ ☑ CHANGE IN VALUE ↑↓
⠿ ☑ ENDING VALUE ↑↓
☑ RETURN
☑ BENCHMARKS

Apply    Cancel

Reset   Apply   Cancel

METHODS AND SYSTEMS FOR GENERATING ELECTRONIC COMMUNICATIONS FEATURING CONSISTENT DATA STRUCTURING AND DYNAMICALLY-DETERMINED DATA CONTENT FOR END-USER SPECIFIC DATA IN ENVIRONMENTS WITH DATA STORAGE CONSTRAINTS

CROSS-REFERENCE TO RELATED APPLICATIONS

This application is a Continuation of U.S. Ser. No. 17/206,404, filed Mar. 19, 2021, the subject matter of which is incorporated herein by reference in its entirety.

BACKGROUND

The number and type of electronic communications being distributed is increasing exponentially. In many cases, these communications require mass distribution (or least distribution to different entities), as well as some level of customization that is specific to the receiving entity. In many cases, these conflicting goals may be addressed through automated or semi-automated systems that perform one or more customizations to that data. However, in such cases, the systems must receive, store, and process data to generate the customizations. The systems may then store the customized formats (e.g., for each different entity) prior to transmitting the customized communications.

These conventional systems raise numerous concerns. First, there is an inherent processing and storage requirement for each communication. These processing and storage requirements increase exponentially as the number of communications required increases (e.g., into the tens of millions during mass communications). Additionally or alternatively, the processing and storage requirements also increase as the size of the communications (e.g., the file size and/or amount of data) increase. These technical problems, in addition to the need to maintain privacy and security during the various processing and storage steps, creates difficulties for communication distribution.

SUMMARY

Accordingly, methods and systems are described herein for improving communication distribution. In particular, methods and systems are described herein for improving communication distribution in environments where there is both the need for end-user specific data (e.g., customized content) and/or data storage constraints. For example, in order to address security/privacy concerns during communication distribution, the methods and systems use a novel architecture that limits the amount of data that must be stored. Specifically, the system does not require permanent storage of communications featuring end-user specific data prior to the distribution of these communications. Accordingly, the storage requirements are greatly diminished, and privacy/security concerns are avoided.

Additionally, the system addresses another technical hurdle that arises in environments where there is a need for end-user specific data (e.g., customized content) while simultaneously avoiding excess storage requirements and privacy/security concerns. For example, in systems where end-user specific data is required, but storage requirements are limited. A conventional solution would be to increase individual processing for a given communication (e.g., generating each communication "on-the-fly"). However, such an approach greatly increases the aggregate processing requirements for a set of communications. In order to address this further technical hurdle that arises due to the methods and systems, a novel architecture is used by means of an additional technical feature that limits the amount of data that must be stored.

Specifically, each communication in a set of communications (e.g., the set of communications that are included in a mass distribution) comprises a series of components. Each component provides an encapsulation of, and interoperability between, a set of component elements for that component. Furthermore, each component corresponds to an application programming interface ("API") specific for that component. The methods and systems further standardize the data structuring (e.g., the layout, format, and/or graphical characteristics) of each component in the set of communications, but relies on the component specific API to populate the end-user specific content for each component. Moreover, the component specific API populates the end-user specific content by accessing end-user specific databases (e.g., featuring natively stored available data that may be aggregated, modified, filtered, etc. to generate the end-user specific content requested by each component specific API). Accordingly, by limiting only certain types of data to "on-the-fly" generation, the methods and systems limit the amount of data that must be stored and lowers privacy/security concerns. Additionally, by standardizing the data structuring, the methods and systems limit the amount of processing required to distribute the set of communications.

As yet another technical benefit, the methods and systems allow users to configure the data structuring and/or the types of dynamically-determined data content used in a set of communications through a graphical user interface. Furthermore, the user interface may impose rules and/or constraints on the components featured in the communications without first executing the component specific APIs. Accordingly, the methods and systems allow users to modify the look and feel of a communication and/or the type of data content presented therein, without actually having to access any end-user specific content. Thus, even though users may have increased ability to configure the set of communications, there is not an increased risk to the security and/or privacy of the underlying end-user data.

In some aspects, to achieve one or more of these technical benefits, systems and methods for generating electronic communications featuring consistent data structuring and dynamically-determined data content for transmission across computer networks are provided. For example, the system may receive a first selection, wherein the first selection comprises a first component for including in a set of communications, wherein the first component provides an encapsulation of, and interoperability between, a first set of component elements, and wherein the first component corresponds to a first API. The system may receive a third selection, wherein the third selection defines a first data structure characteristic for the first component, wherein the first data structure characteristic comprises a criterion for which the first component is presented in the set of communications. The system may receive a fourth selection, wherein the fourth selection defines a first data content characteristic for the first component, wherein the first data content characteristic comprises a criterion for what data content is populated in the first component in the set of communications. The system may receive a fifth selection, wherein the fifth selection requests generation of a set of communications, wherein the set of communications includes a first communication for a first end user and a second communication for a second end user. The system may populate, by the first API, the first component with first data content in the first communication by: determining a first data source corresponding to the first end user; retrieving available first data content from the first data source; and filtering the available first data content based on the first data content characteristic. The system may transmit the first communication to the first end user, wherein the first data content is generated for display, on a first device corresponding to the first end user, in the first communication at a display location based on the first data structure characteristic.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

BRIEF DESCRIPTION OF THE DRAWINGS

FIGS. 1A-B depicts a user interface for generating electronic communications, in accordance with an embodiment.

FIGS. 2A-C depicts another user interface for generating electronic communications, in accordance with an embodiment.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details, or with an equivalent arrangement. In other cases, well-known structures and devices are shown in block diagram form in order to avoid unnecessarily obscuring the embodiments of the invention.

Figure 1B:
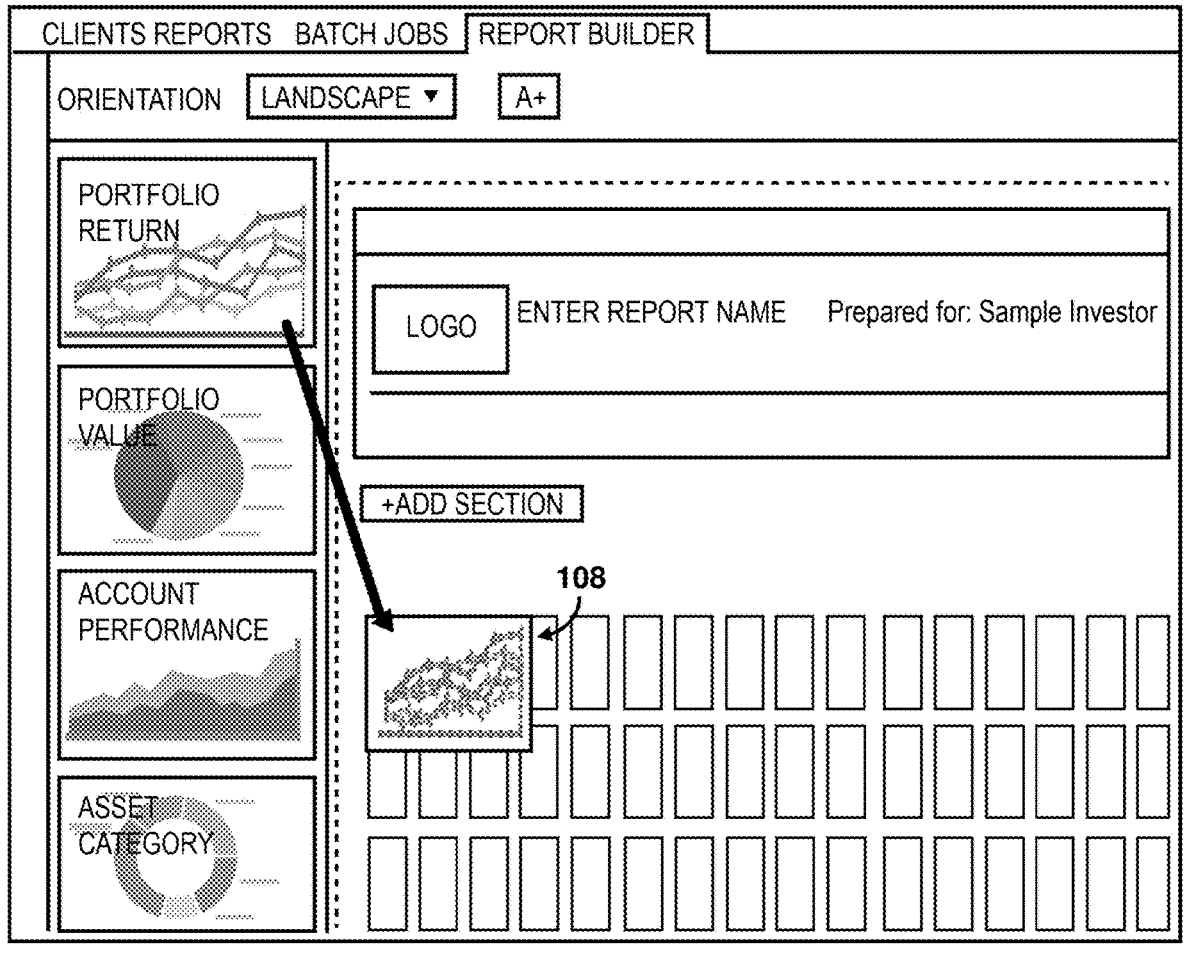

FIGS. 1A-B depicts a user interface for generating electronic communications, in accordance with an embodiment. For example, FIGS. 1A-B may be used to generate electronic communications featuring consistent data structuring and dynamically-determined data content for transmission across computer networks for end user specific data in environments with data storage constraints.

As referred to herein, a "user interface" may comprise a human-computer interaction and communication in a device, and may include display screens, keyboards, a mouse, and may take the appearance of a desktop. For example, a user interface may comprise the way a user interacts with an application or a website. As referred to herein, "content" should be understood to mean an electronically consumable user asset, such as data, reports, graphs, etc. as well as other programming, Internet content (e.g., streaming content, downloadable content, Webcasts, etc.), video clips, audio, information, pictures, rotating images, documents, playlists, websites, articles, books, electronic books, blogs, advertisements, chat sessions, social media, applications, games, and/or any other media or multimedia and/or combination of the same. As referred to herein, the term "multimedia" should be understood to mean content that utilizes at least two different content forms described above, for example, text, audio, images, video, or interactive content forms.

In some embodiments, data content may be personalized for a user (or end-user) based on the user preferences (e.g., as stored in a user profile) and/or a data source specific to the end-user (e.g., containing data about the end-user). A user profile may be a directory of stored user settings, preferences, and information related to a user (or end-user) account. For example, a user profile may have the settings for the user's installed programs and operating system. In some embodiments, the user profile may be a visual display of data associated with a specific user, or a customized desktop environment. In some embodiments, the user profile may be digital representation of a person's identity. The data in the user profile may be generated based on the system actively or passively monitoring user activity (e.g., the system may present suggested components for a report based on the user's past activity).

For example, FIG. 1A includes component 102, which may be part of a component library. As referred to herein, a component may comprise a set of features that provide a standard component model for an application (e.g., a report builder used to generate a communication featuring a report). In some embodiments, a component may comprise a specific feature and/or function of an application that is distinguishable from other features and/or functions. For example, the component may be a web component that has a set of features that provide a standard component model for web applications, and the component allows for encapsulation and interoperability of individual HTML and/or PDF elements. For example, a component may provide encapsulation of, and interoperability between, a set of component elements. Additionally or alternatively, the component may correspond to a particular API of a plurality of APIs (e.g., in a library of APIs).

FIG. 1A shows user interface 100. User interface 100 includes content having a plurality of sections (e.g., section 104 and section 106). As referred to herein, a "section" may comprise any of the more or less distinct parts into which the content may be divided, or from which the content is composed. For example, a section may be distinguished from another section by one or more section characteristics. In user interface 100, the system may identify a section of the plurality of sections as having a section characteristic.

A section characteristic may comprise any characteristic that distinguishes one section from another. For example, a section characteristic may be one or more criteria, constraints, and/or requirements for data content and/or data structuring in the section. For example, the section characteristic may relate to media-related information (e.g., font size, media type (e.g., graph, audio, video, text, etc.) ordering, heading information, titles, descriptions, ratings information, source code data (e.g., HTML, source code headers, etc.), genre or category information, subject matter information, author/actor information, logo data, or other identifiers), media format, file type, object type, objects appearing in the content (e.g., product placements, advertisements, keywords, context), or any other suitable information used to distinguish one section from another.

For example, user interface 100 includes section 106. The system may identify section 106 based on a paragraph or section break, and/or an HTML tag. The system may parse the section for threshold data content characteristics (e.g., one or more criteria, constraints, and/or requirements for data content in the section). As referred to herein, a "data content characteristic" may comprise a characteristic related to what content may appear in a component. For example, a data content characteristic may relate to media-related information (e.g., font size, media type (e.g., graph, audio, video, text, etc.) ordering, heading information, titles, descriptions, ratings information, source code data (e.g., HTML, source code headers, etc.), genre or category information, subject matter information, author/actor information, logo data, or other identifiers), media format, file type, object type, objects appearing in the component (e.g., graphs, advertisements, keywords, context), or other data retrieved from an end-user specific database. For example, a data content characteristic may comprise a criterion for what data content is populated in a component in the set of communications.

Component 102 may also include a data structure characteristic. As referred to herein, a "data structure characteristic" may comprise a characteristic related to where or how data content for a component may appear in a communication and/or set of communications. For example, a data structure characteristic may indicate a location, size, shape, orientation, alignment, position, and/or other layout/formatting concern for the component in the communication. For example, the data structure characteristic may comprise a criterion for where a component is presented in a set of communications.

As shown in FIG. 1B, the system may receive a user selection selecting component 102 from a library of available components, and the system places component 102 into section 106. In response to the user selection, component 102 is oriented according to grid 108. For example, section 106 may comprise line-based placement guides (or guides based on other shapes, arrangements, etc.) for defining areas into which a component may be placed. For example, grid 108 may comprise a template, which may be blank or preconfigured. For example, a preconfigured template for a section may include predetermined sections, section characteristics, components, data content characteristics, and/or data structure characteristics.

FIGS. 2A-C depict another user interface for generating electronic communications, in accordance with an embodiment. For example, FIG. 2A shows a component positioned in a section of a communication. For example, the component shown in user interface 200 may correspond to component 102 (FIG. 1). In response to the component being positioned in the section, the system may perform various comparisons and/or determinations.

For example, the system may apply a constraint and/or requirement to a type of data featured in a component based on a selected data structure characteristic. For example, as the system may not generate the actual data (e.g., populate the data content prior to creating a communication), the system may need to automatically determine if a selected data structure characteristic interferes with and/or obscures data populated in a component. For example, a data structure characteristic setting a small size for a component may interfere with the ability of an end-user to see small type and/or a chart in the communication. Therefore, the system may need to alert the user of this issue (e.g., generate alert 252 as shown in FIG. 2B). The system may then determine these issues based on comparisons with thresholds related to characteristics. For example, the system may determine a threshold data content characteristic based on a data structure characteristic. The system may compare the data content characteristic to the threshold data content characteristic. The system may apply the data content characteristic to the component based on the data content characteristic corresponding to the threshold data content characteristic. If the system determines that the first data content characteristic does not corresponds to the threshold data content characteristic, the system may generate an alert (e.g., alert 252 (FIG. 2B)).

Additionally or alternatively, in some embodiments, the system may apply a constraint and/or requirement to a type of data featured in a component based on a selected data content characteristic of another component. For example, as the system may not generate the actual data (e.g., populate the data content prior to creating a communication), the system may need to automatically determine if a selected data content characteristic relates to data populated in another component. For example, if two adjacent components are set to present the same type of data (e.g., the same value (e.g., title) for two graphs), the system may alert the user. The system may thus determine these issues based on comparisons with thresholds related to characteristics and/or between two or more characteristics of components. For example, if a communication (e.g., a report) at run time (e.g., at a time the set of communications is generated such as in response to a user selection using user interface 250) a selected component is configured to present a duplicate column of data based upon time period selection by the user, the system may cause one component to remove (or the system itself may remove) one of the two columns (e.g., modify the data characteristics of one component) in order to improve the user experience. For example, adjacent component behavior constraints and/or alerts may be triggered by the system in reference to overlapping and/or competing size constraints (e.g., data structuring characteristics as they related to data content characteristics) based upon initial design time renders (e.g., automatic determination by the system prior to creating a communication and/or the presentation of data in a preview configuration) of component content.

FIG. 2C shows a user interface 270, in which the system may receive user inputs adjusting sections, section characteristics, components, data content characteristics, and/or data structure characteristics. For example, a user (e.g., an administrator or other user of the application) may submit a request to change data fields (e.g., field names or other values), add data fields, or remove data fields of one or more components. Based on the request, the system may implement the requested actions. The system may allow the user to enter the requests through a graphical user interface, and without having to access underlying end-user specific data.

User interface 270 may also include one or more drop down menus or other options. Each of the drop down menus may include one or more data fields, at least some of which may be customized via supplemental information (e.g., application metadata) that is obtained from one or more databases (e.g., over a network from application databases), and loaded to user interface 270 at application launch (or any other application state triggering the obtainment or loading of the data fields). In one use case, the system may receive a user selection selecting one or more of the data fields of drop down menus to generate a communication (e.g., a report). A selected data field (or a combination of data fields) may correspond to a data calculation, a query operation, or other operation. For example, when the user submits a request to generate a report based on the selected data fields, such corresponding operations may be invoked by query subsystem (or other components of the system) to obtain the results for the report. A data calculation operation may include one or more statistical or other mathematical calculations performed on data retrieved via one or more queries (e.g., data that correspond to the parameters of the data calculation and is stored in tables or other data sources). A query operation may include one or more queries or query operators (e.g., a join condition to join data that corresponds to the parameters of the query operation and is stored in a table or other data sources).

Figure 3:
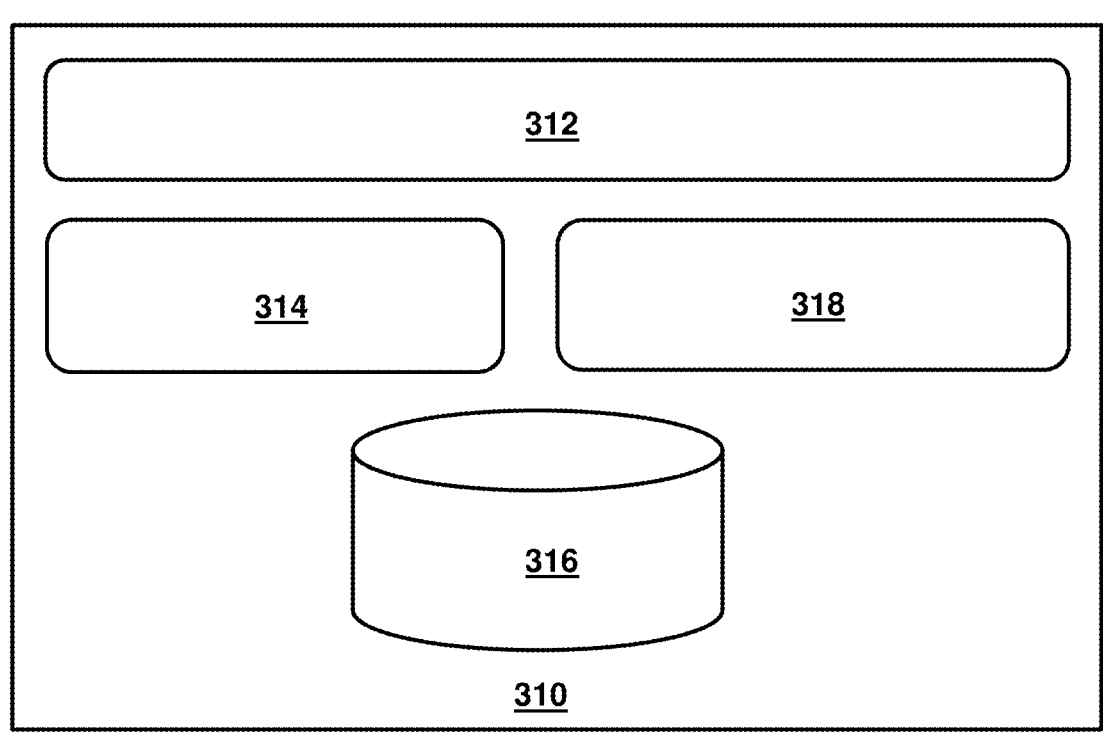
FIG. 3 depicts an illustrative system for generating electronic communications, in accordance with an embodiment.
Figure 3:
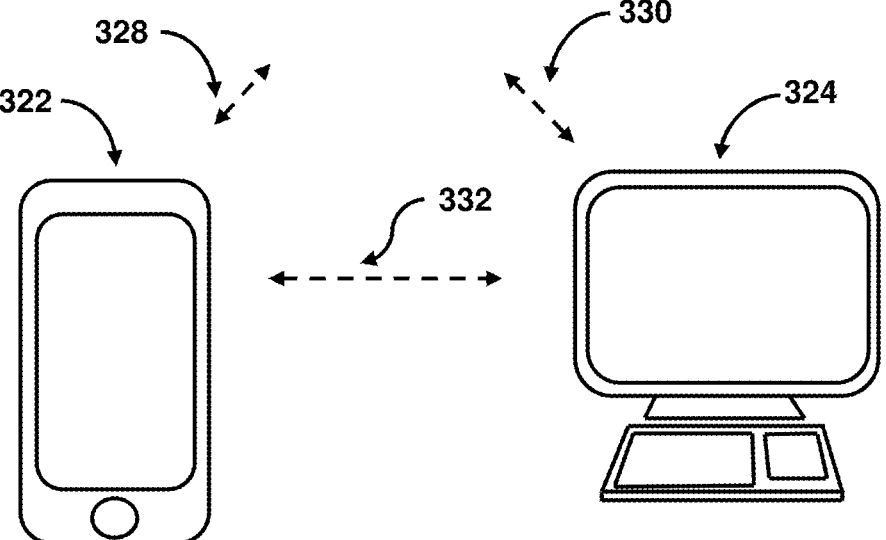

FIG. 3 depicts an illustrative system for generating electronic communications, in accordance with an embodiment. For example, system 300 may represent the features and/or elements used to select components and provide data related to the components. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. For instance, users may utilize one or more devices to interact with one another, one or more servers, or other components of system 300. It should be noted, that, while one or more operations are described herein as being performed by particular components of system 300, those operations may, in some embodiments, be performed by other components of system 300. As an example, while one or more operations are described herein as being performed by components of mobile device 322, those operations, may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device, such as a computer screen and/or a dedicated input device such as a remote control, mouse, voice input, etc.). Additionally, the devices in system 300 may run an application (or another suitable program). The application may cause the processors and/or control circuitry to perform operations related to generating alternative content.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or collectively include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include multiple features. For example, cloud components 310 include presentation services 312. Presentation services 312 may generate communications based on the results of component API functions. Presentation services 312 may include report builder functionality. For example, System 300 also includes API layer 314. API layer 314 may comprise a library of APIs that are specific to a given component. In some embodiments, API layer 314 may be implemented on user device 322 or user terminal 324. Alternatively or additionally, API layer 314 may reside on one or more of cloud components 310. API layer 314 (which may be A REST or Web services API layer) may provide a decoupled interface to data and/or functionality of one or more applications. API layer 314 may provide a common, language-agnostic way of interacting with an application. Web services APIs offer a well-defined contract, called WSDL, that describes the service in terms of its operations and the data types used to exchange information. REST APIs do not typically have this contract; instead, they are documented with client libraries for most common languages including Ruby, Java, PHP, and JavaScript. SOAP Web services have traditionally been adopted in the enterprise for publishing internal services, as well as for exchanging information with partners in B2B transactions.

API layer 314 may use various architectural arrangements. For example, system 300 may be partially based on API layer 314, such that there is strong adoption of SOAP and RESTful Web-services, using resources like Service Repository and Developer Portal, but with low governance, standardization, and separation of concerns. Alternatively, system 300 may be fully based on API layer 314, such that separation of concerns between layers like API layer 314, services, and applications are in place.

In some embodiments, the system architecture may use a microservice approach. Such systems may use two types of layers: Front-End Layers and Back-End Layers, where microservices reside. In this kind of architecture, the role of the API layer 314 may provide integration between Front-End and Back-End layers. In such cases, API layer 314 may use RESTful APIs (exposition to front-end or even communication between microservices). API layer 314 may use AMQP (e.g., Kafka, RabbitMQ, etc.). API layer 314 may implement incipient usage of new communications protocols, such as gRPC, Thrift, etc.

In some embodiments, the system architecture may use an open API approach. In such cases, API layer 314 may use commercial or open source API Platforms and their modules. API layer 314 may use a developer portal. API layer 314 may use strong security constraints applying WAF and DDoS protection, and API layer 314 may use RESTful APIs as standard for external integration.

Cloud components 310 also include datastore 316, which may include both component metadata and/or end-user specific data. In some embodiments, datastore 316 may be distributed across a computer network. System 300 may make one or more API calls/requests for data from datastore 316. Cloud components 310 also include rendering services 318. For example, rendering services 318 may comprise software that draws text and images on the screen. Rendering services 318 may draw structured text from a document (e.g., HTML), and may format it properly based on the given style declarations (e.g., CSS).

Figure 4:
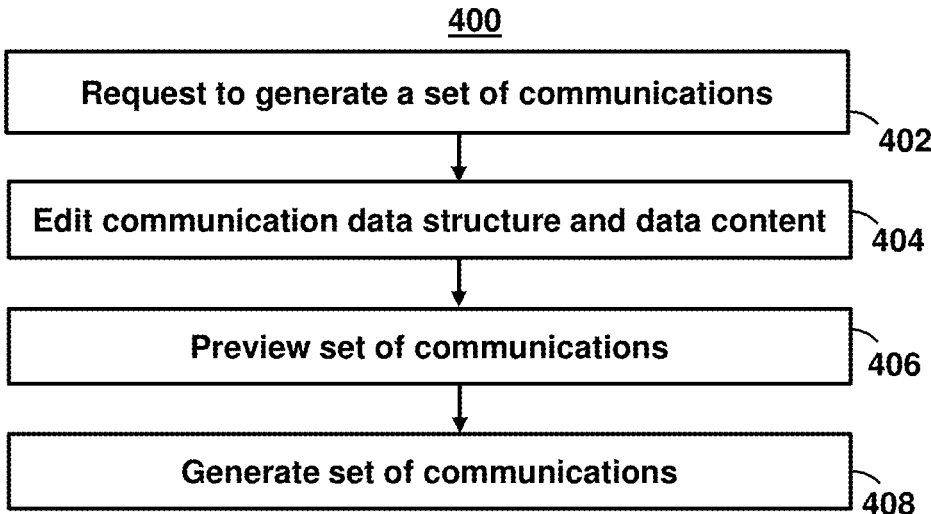
FIG. 4 depicts a process for generating electronic communications using a user interface, in accordance with an embodiment.

FIG. 4 depicts a process for generating electronic communications featuring consistent data structuring and dynamically-determined data content for transmission across computer networks. For example, FIG. 4 shows process 400, which may be implemented by one or more devices. The system may implement process 400 in order to generate one or more of the user interfaces (e.g., as described in FIGS. 1A-2C). For example, process 400 may describe a process for generating reports (e.g., for financial services). For example, a user may access a system for generating sets of communications. For example, the system may access functionality within the system for generating reports on financial services. For example, a user may need to generate unique reports for messaging for to their clients. The unique reports may need to have standard formats and structure, but the system may need to be populated with client specific data.

For example, the system may allow users to configure the data structure and/or the types of dynamically-determined data content used in a set of communications through a graphical user interface. For example, the user interface (e.g., user interface 100 (FIG. 1)) may impose rules and/or constraints on the components featured in the communications without first executing the component specific APIs. Accordingly, the methods and systems allow users to modify the look and feel of a communication and/or the type of data content presented therein without actually having to access any end-user specific content. Thus, even though users may have increased ability to configure the set of communications, there is no risk to the security and/or privacy of the underlying end-user data. It should be noted that, as described herein, the various selections may be entered via a graphical user interface (e.g., user interface 100 (FIG. 1)).

At step 402, process 400 (e.g., using control circuitry and/or one or more components described in FIGS. 1-3) receives a request to generate a set of communications. For example, the system may receive a user selection (e.g., in user interface 100 (FIG. 1A)) to either create a new component in a report and/or to edit one of the pre-existing reports (and/or components therein) on screen in a graphical user interface (e.g., in user interface 100 (FIG. 1A)). The system may also provide a design grid page (e.g., as shown in FIGS. 2A-C) that allows a user to select and/or position the component.

At step 404, process 400 (e.g., using control circuitry and/or one or more components described in FIGS. 1-3) receives edits to a data structure and/or data content of a component in the set of communications. For example, the system may receive a user selection (e.g., in user interface 100 (FIG. 1A)) directly editing the components, removing/adding new components, resizing components, and/or changing component locations on screen (e.g., as shown in FIG. 2B).

At step 406, process 400 (e.g., using control circuitry and/or one or more components described in FIGS. 1-3) generates a preview of the set of communications. For example, the system may allow edits to take immediate effect, and may be previewed in design form on screen (e.g., as shown in FIG. 2B) or through a preview mechanism in a format featuring text formatting and images, in a manner independent of application software, hardware, and operating systems. In some embodiments, the system may also include a watermark indicating that this is a preview.

At step 408, process 400 (e.g., using control circuitry and/or one or more components described in FIGS. 1-3) generates the set of communications. For example, the system may generate a report that may then be distributed to numerous end users. The reports may include end user specific data displayed in a standardized format that is platform independent. In some embodiments, the report may be available to be used everywhere on the platform immediately in a format featuring text formatting and images, in a manner independent of application software, hardware, and operating systems.

For example, the system may deliver an editable, but preconfigured content, delivered on an easy to use platform with guardrail constraints to allow for even the most novice or time demanding user to create a new report that meets certain requirements. Also, the system provides a native ability to call elements for components externally through API and/or Web Services. Accordingly, users may edit and/or create reports even without the native builder tool on their own sites.

It is contemplated that the steps or descriptions of FIG. 4 may be used with any other embodiment of this disclosure. In addition, the steps and descriptions described in relation to FIG. 4 may be performed in alternate orders, or in parallel to further the purposes of this disclosure. For example, each of these steps may be performed in any order, in parallel, or simultaneously to reduce lag, or increase the speed of the system or method. Furthermore, it should be noted that any of the devices or equipment discussed in relation to FIGS. 1-3 could be used to perform one of more of the steps in FIG. 4.

Figure 5:
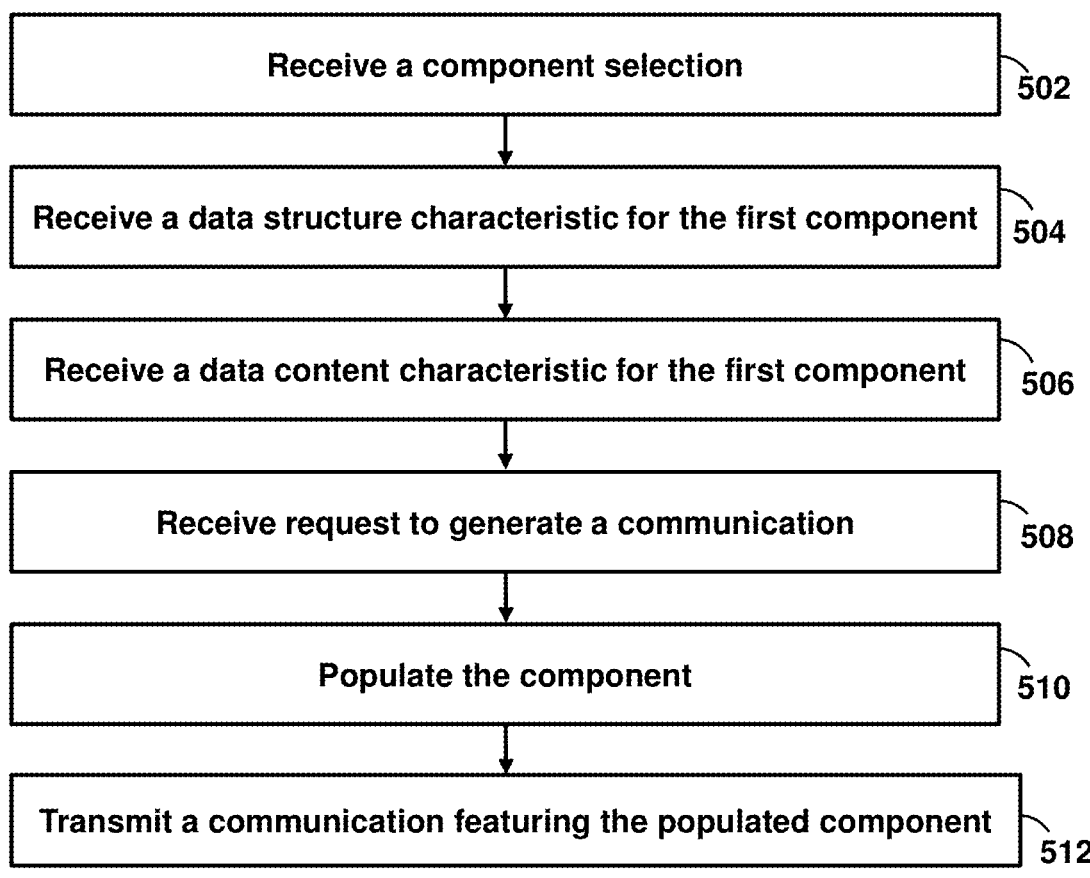
FIG. 5 depicts a process for generating electronic communications featuring consistent data structuring and dynamically-determined data content for transmission across computer networks for end user specific data in environments with data storage constraints, in accordance with an embodiment.

FIG. 5 depicts a process for generating electronic communications featuring consistent data structuring and dynamically-determined data content for transmission across computer networks. For example, FIG. 5 shows process 500, which may be implemented by one or more devices. The system may implement process 500 in order to generate one or more of the user interfaces (e.g., as described in FIGS. 1A-2C). For example, process 500 may be used by a system in environments where there is a need for end-user specific data (e.g., customized content) while simultaneously avoiding excess storage requirements, processing requirements and privacy/security concerns. It should be noted that, as described herein, the various selections may be entered via a graphical user interface (e.g., user interface 100 (FIG. 1)).

At step 502, process 500 (e.g., using control circuitry and/or one or more components described in FIGS. 1-3) receives a component selection. For example, the system may receive, e.g., by control circuitry, a first selection, wherein the first selection comprises a first component for including in a set of communications, wherein the first component provides encapsulation of, and interoperability between, a first set of component elements, and wherein the first component corresponds to a first API. For example, each communication in a set of communications (e.g., the set of communications that are included in a mass distribution) may comprise a series of components. Each component may provide encapsulation of, and interoperability between, a set of component elements for that component. Furthermore, each component may correspond to an API that is specific for that component.

For example, the system may retrieve the first component from a library of available components (e.g., as shown in FIG. 1A-B). The system may then retrieve the first API from a plurality of APIs, wherein each API of the plurality of APIs comprises a rendering engine specific to a respective component of the library of available components. For example, the rendering engine may comprise software that draws text and images on the screen. The rendering engine may draw structured text from a document (e.g., HTML), and may format it properly based on the given style declarations (e.g., CSS).

In some embodiments, the system may generate a communication (e.g., a report) that comprises multiple components. For example, the system may receive a second selection, wherein the second selection comprises a second component for including in the set of communications, wherein the second component provides encapsulation of, and interoperability between, a second set of component elements, and wherein the second component corresponds to a second API. For example, the second API may cause functions and/or have elements that are different that the first API. The system may receive a sixth selection, wherein the sixth selection defines a second data content characteristic for the second component, wherein the second data content characteristic comprises a criterion for what data content is populated in the second component in the set of communications. The system may populate, by the second API, the second component with second data content in the first communication. In some embodiments, the system may populate the second component by determining the first data source corresponding to the first end user, retrieving available second data content from the first data source, filtering the available second data content based on the second data content characteristic. For example, the second API may access the same data (e.g., data specific to a particular end-user) as the first API, but may cause different functions to occur (e.g., aggregate different data, generating different graphics, etc.).

At step 504, process 500 (e.g., using control circuitry and/or one or more components described in FIGS. 1-3) receives a data structure characteristic for the first component. For example, the system may receive, e.g., by the control circuitry, a third selection, wherein the third selection defines a first data structure characteristic for the first component, wherein the first data structure characteristic comprises a criterion for where the first component is presented in the set of communications.

For example, the communication may be segmented into different sections, and each section may have different section characteristics (e.g., constraints and/or requirements related to size, formatting, data types, etc.). The system may express these section characteristics through various thresholds. For example, the system may determine a section characteristic for a section, in the set of communications, comprising the first component. For example, each communication in the set of communications may comprise a series of sections that defines a layout of the set of communications, and each section of the series of sections may be defined by a respective grid, the boundaries of which are defined by one or more section characteristics.

The system may then determine a threshold data structure characteristic based on the section characteristic. The system may compare the first data structure characteristic to the threshold data structure characteristic. For example, in response to determining that the characteristic meets and/or exceeds the threshold, the system may use the data structure characteristic. For example, the system may apply the first data structure characteristic to the first component based on the first data structure characteristic corresponding to the threshold data structure characteristic. If the system determines that the first data structure characteristic does not correspond to the threshold data structure characteristic, the system may generate an alert (e.g., alert 252 (FIG. 2B)).

At step 506, process 500 (e.g., using control circuitry and/or one or more components described in FIGS. 1-3) receives a data content characteristic for the first component. For example, the system may receive, e.g., by the control circuitry, a fourth selection, wherein the fourth selection defines a first data content characteristic for the first component, wherein the first data content characteristic comprises a criterion for what data content is populated in the first component in the set of communications. For example, the system may standardize the data structuring (e.g., the layout, format, and/or graphical characteristics) of each component in the set of communications, but the system relies on the component specific API to populate the end-user specific content for each component. For example, the first data structure characteristic for the first component may comprise a mapping of the first component to the respective grid of a section of the series of sections in which the first component is presented in the set of communications. The system may define the grid according to one or more thresholds against which the mapping is compared.

In some embodiments (e.g., as described in FIG. 4 above), the system may receive a seventh selection, wherein the seventh selection defines a third data structure characteristic for the first component, wherein the third data structure characteristic comprises a criterion for what shape the first component is presented in the set of communications. For example, the system may receive user inputs that define the size and/or shape of the component. Additionally or alternatively, the system may determine a second data structure characteristic for the first component and/or the second component.

In some embodiments, the system may apply a constraint and/or requirement to a type of data featured in a component based on the selected data structure characteristic. For example, as the system may not generate the actual data (e.g., populate the data content prior to creating a communication), the system may need to automatically determine if a selected data structure characteristic interferes with and/or obscures data populated in a component. For example, a data structure characteristic setting a small size for a component may interfere with the ability of an end-user to see small type and/or a chart in the communication. Therefore, the system may need to alert the user to this issue. The system may thus determine these issues based on comparisons with thresholds related to characteristics. For example, the system may determine a threshold data content characteristic based on the first data structure characteristic. The system may compare the first data content characteristic to the threshold data content characteristic. The system may apply the first data content characteristic to the first component based on the first data content characteristic corresponding to the threshold data content characteristic. If the system determines that the first data content characteristic does not correspond to the threshold data content characteristic, the system may generate an alert (e.g., alert 252 (FIG. 2B)).

Additionally or alternatively, in some embodiments, the system may apply a constraint and/or requirement to a type of data featured in a first component based on the selected data content characteristic of another component. For example, as the system may not generate the actual data (e.g., populate the data content prior to creating a communication), and the system may need to automatically determine if a selected data content characteristic relates to data populated in another component. For example, if two adjacent components are set to present the same type of data (e.g., the same value (e.g., title) for two graphs), the system may alert the user. The system may thus determine these issues based on comparisons with thresholds related to characteristics and/or between two or more characteristics of components. For example, if a communication (e.g., a report) at run time (e.g., at a time the set of communications is generated) a selected component is configured to present a duplicate column of data based upon time period selection by the end user, the component (and/or system) may drop one of the two columns in order to improve the user experience.

For example, the system may receive a second selection, wherein the second selection comprises a second component for including in the set of communications, wherein the second component provides encapsulation of, and interoperability between, a second set of component elements, and wherein the second component corresponds to a second API. The system may receive a sixth selection, wherein the sixth selection defines a second data content characteristic for the second component, wherein the second data content characteristic comprises a criterion for what data content is populated in the second component in the set of communications. The system may determine a threshold data content characteristic based on the first data content characteristic. The system may compare the second data content characteristic to the threshold data content characteristic. The system may apply the second data content characteristic to the second component based on the second data content characteristic corresponding to the threshold data content characteristic. If the system determines that the second data content characteristic does not corresponds to the threshold data content characteristic, the system may generate an alert (e.g., alert 252 (FIG. 2B)).

At step 508, process 500 (e.g., using control circuitry and/or one or more components described in FIGS. 1-3) receives a request to generate a communication. For example, the system may receive, e.g., by the control circuitry, a fifth selection, wherein the fifth selection requests generation of the set of communications, wherein the set of communications includes a first communication for a first end user and a second communication for a second end user. For example, the system may receive a selection from a user to generate a series of communications in which each communication has a standardized data structure and component type, but the system individually populates each with end-user specific data.

At step 510, process 500 (e.g., using control circuitry and/or one or more components described in FIGS. 1-3) populates the component. For example, the system may populate, e.g., by the first API, the first component with first data content in the first communication. For example, the system may populate the first component by determining a first data source corresponding to the first end user, retrieving available first data content from the first data source, and filtering the available first data content based on the first data content characteristic. For example, the system may use the API to populate the end-user specific content by accessing end-user specific databases (e.g., featuring natively stored available data content that may be aggregated, modified, filtered, etc. to generate the end-user specific content requested by each component specific API). By limiting only certain types of data to "on-the-fly" generation, the system may limit the amount of data that must be stored and relieve privacy/security concerns. Additionally, by standardizing the data structuring, the system may limit the amount of processing required to distribute the set of communications.

At step 512, process 500 (e.g., using control circuitry and/or one or more components described in FIGS. 1-3) transmits a communication featuring the populated component. For example, the system may transmit the first communication to the first end user, wherein the first data content is generated for display, on a first device corresponding to the first end user, in the first communication at a display location based on the first data structure characteristic. For example, the system may allow users to modify the look and feel of a communication, and/or the type of data content presented, without actually having to access any end-user specific content. Accordingly, each end-user may receive a communication in a standardized format, but with his/her own specific data.

The above-described embodiments of the present disclosure is presented for purposes of illustration, and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method of generating electronic communications featuring consistent data structuring and dynamically-determined data content for transmission across computer networks, the method comprising: receiving a first selection, wherein the first selection comprises a first component for including in a set of communications, wherein the first component provides encapsulation of, and interoperability between, a first set of component elements, and wherein the first component corresponds to a first application programming interface ("API"); receiving a third selection, wherein the third selection defines a first data structure characteristic for the first component, wherein the first data structure characteristic comprises a criterion for where the first component is presented in the set of communications; receiving a fourth selection, wherein the fourth selection defines a first data content characteristic for the first component, wherein the first data content characteristic comprises a criterion for what data content is populated in the first component in the set of communications; receiving a fifth selection, wherein the fifth selection requests generation of the set of communications, wherein the set of communications includes a first communication for a first end user and a second communication for a second end user; populating, by the first API, the first component with first data content in the first communication by: determining a first data source corresponding to the first end user; retrieving available first data content from the first data source; and filtering the available first data content based on the first data content characteristic; transmitting the first communication to the first end user, wherein the first data content is generated for display, on a first device corresponding to the first end user, in the first communication at a display location based on the first data structure characteristic.

3. The method of any of the preceding claims, further comprising: receiving a second selection, wherein the second selection comprises a second component for including in the set of communications, wherein the second component provides encapsulation of, and interoperability between a second set of component elements, and wherein the second component corresponds to a second API; receiving a sixth selection, wherein the sixth selection defines a second data content characteristic for the second component, wherein the second data content characteristic comprises a criterion for what data content is populated in the second component in the set of communications; and populating, by the second API, the second component with second data content in the first communication by: determining the first data source corresponding to the first end user; retrieving available second data content from the first data source; and filtering the available second data content based on the second data content characteristic.

4. The method of any of the preceding claims, further comprising: determining a section characteristic for a section, in the set of communications, comprising the first component; determining a threshold data structure characteristic based on the section characteristic; comparing the first data structure characteristic to the threshold data structure characteristic; and applying the first data structure characteristic to the first component based on the first data structure characteristic corresponding to the threshold data structure characteristic.

5. The method of any of the preceding claims, further comprising: determining a threshold data content characteristic based on the first data structure characteristic; comparing the first data content characteristic to the threshold data content characteristic; and applying the first data content characteristic to the first component based on the first data content characteristic corresponding to the threshold data content characteristic.

6. The method of any of the preceding claims, further comprising: receiving a second selection, wherein the second selection comprises a second component for including in the set of communications, wherein the second component provides encapsulation of, and interoperability between, a second set of component elements, and wherein the second component corresponds to a second API; receiving a sixth selection, wherein the sixth selection defines a second data content characteristic for the second component, wherein the second data content characteristic comprises a criterion for what data content is populated in the second component in the set of communications; and determining a threshold data content characteristic based on the first data content characteristic; comparing the second data content characteristic to the threshold data content characteristic; and applying the second data content characteristic to the second component based on the second data content characteristic corresponding to the threshold data content characteristic.

7. The method of any of the preceding claims, wherein each communication in the set of communications comprises a series of sections that defines a layout of the set of communications, and wherein each section of the series of sections is defined by a respective grid.

8. The method of any of the preceding claims, wherein the first data structure characteristic for the first component comprises a mapping of the first component to the respective grid of a section of the series of sections in which the first component is presented in the set of communications.

9. The method of any of the preceding claims, further comprising: retrieving the first component from a library of available components; and retrieving the first API from a plurality of APIs, wherein each API of the plurality of APIs comprises a rendering engine specific to a respective component of the library of available components.

10. The method of any of the preceding claims, further comprising receiving a seventh selection, wherein the seventh selection defines a third data structure characteristic for the first component, wherein the third data structure characteristic comprises a criterion for what shape the first component is presented in the set of communications.

11. The method of any of the preceding claims, wherein the first selection, the third selection, the fourth selection, the fifth selection, and the seventh selection are received in a graphical user interface.

12. A tangible, non-transitory, machine-readable medium storing instructions that, when executed by a data processing apparatus, cause the data processing apparatus to perform operations comprising those of any of embodiments 1-11.

13. A system comprising: one or more processors and memory storing instructions that, when executed by the processors, cause the processors to effectuate operations comprising those of any of embodiments 1-11.

14. A system comprising means for performing any of embodiments 1-11.

What is claimed is:

1. A system for generating electronic communications featuring consistent data structuring and dynamically-determined data content for transmission across computer networks for end user specific data in environments with data storage constraints, the system comprising:

memory configured to store:
  a plurality of data sources, wherein each data source of the plurality of data sources corresponds to a respective end user of a plurality of end users;
  a plurality of application programming interfaces ("APIs");

control circuitry configured to:
  receive a first selection, wherein the first selection comprises a first component for including in a set of communications, wherein the first component provides encapsulation of, and interoperability between, a first set of component elements, and wherein the first component corresponds to a first API of the plurality of APIs;
  receive a third selection, wherein the third selection defines a first data structure characteristic for the first component, wherein the first data structure characteristic comprises a criterion for at least one of where the first component is presented in the set of communications and how the first component appears in the set of communication, and wherein the first data structure characteristic further comprises at least one of a layout, a format, and a graphical characteristic;
  determine a threshold data content characteristic for the first component based on the first data structure characteristic for the first component;
  receive a fourth selection, wherein the fourth selection defines a first data content characteristic for the first component, wherein the first data content characteristic comprises a criterion for what data content is populated in the first component in the set of communications, wherein the first data content characteristic corresponds to the threshold data content characteristic, and wherein the threshold data content characteristic dynamically modifies presentation of data content in real-time or near real-time based on the data structure characteristic;
  receive a fifth selection, wherein the fifth selection requests generation of the set of communications, wherein the set of communications includes a first communication for a first end user of the plurality of end users, and a second communication for a second end user of the plurality of end users;
  populate, by the first API, the first component with first data content in the first communication by:
    determining a first data source of the plurality of data sources corresponding to the first end user;
    retrieving available first data content from the first data source; and filtering the available first data content based on the first data content characteristic;
  populate, by the first API, the first component with second data content in the second communication by:
    determining a second data source of the plurality of data sources corresponding to the second end user;
    retrieving available second data content from the second data source; and
    filtering the available second data content based on the first data content characteristic;
  input/output circuitry configured to:
    transmit the first communication to the first end user, wherein the first data content is generated for display, on a first device corresponding to the first end user, in the first communication at a display location based on the first data structure characteristic; and
    transmit the second communication to the second end user, wherein the first data content is generated for display, on a second device corresponding to the second end user, in the second communication at the display location based on the first data structure characteristic.

2. A method of generating electronic communications featuring consistent data structuring and dynamically-determined data content for transmission across computer networks for end user specific data in environments with data storage constraints, the method comprising:

receiving, by control circuitry, a first selection, wherein the first selection comprises a first component for including in a set of communications, wherein the first component provides encapsulation of, and interoperability between, a first set of component elements, and wherein the first component corresponds to a first application programming interface ("API");

receiving, by the control circuitry, a third selection, wherein the third selection defines a first data structure characteristic for the first component, wherein the first data structure characteristic comprises a criterion for at least one or where the first component is presented in the set of communications and how the first component appears in the set of communication, and wherein the first data structure characteristic further comprises at least one of a layout, a format, and a graphical characteristic;

determining, by the control circuitry, a threshold data content characteristic for the first component based on the first data structure characteristic for the first component;

receiving, by the control circuitry, a fourth selection, wherein the fourth selection defines a first data content characteristic for the first component, wherein the first data content characteristic comprises a criterion for what data content is populated in the first component in the set of communications, wherein the first data content characteristic corresponds to the threshold data content characteristic, and wherein the threshold data content characteristic dynamically modifies presentation of data content in real-time or near real-time based on the data structure characteristic;

receiving, by the control circuitry, a fifth selection, wherein the fifth selection requests generation of the set of communications, wherein the set of communications includes a first communication for a first end user and a second communication for a second end user;

populating, by the first API, the first component with first data content in the first communication by:

determining a first data source corresponding to the first end user;

retrieving available first data content from the first data source; and filtering the available first data content based on the first data content characteristic;

populating, by the first API, the first component with second data content in the second communication by:

determining a second data source of the plurality of data sources corresponding to the second end user;

retrieving available second data content from the second data source; and filtering the available second data content based on the first data content characteristic;

transmitting the first communication to the first end user, wherein the first data content is generated for display, on a first device corresponding to the first end user, in the first communication at a display location based on the first data structure characteristic; and transmitting the second communication to the second end user, wherein the first data content is generated for display, on a second device corresponding to the second end user, in the second communication at the display location based on the first data structure characteristic.

3. The method of claim 2, further comprising receiving a second selection, wherein the second selection comprises a second component for including in the set of communications, wherein the second component provides encapsulation of, and interoperability between, a second set of component elements, and wherein the second component corresponds to a second API;

receiving a sixth selection, wherein the sixth selection defines a second data content characteristic for the second component, wherein the second data content characteristic comprises a criterion for what data content is populated in the second component in the set of communications; and populating, by the second API, the second component with second data content in the first communication by:

determining the first data source corresponding to the first end user;

retrieving available second data content from the first data source; and filtering the available second data content based on the second data content characteristic.

4. The method of claim 2, further comprising:

determining a section characteristic for a section, in the set of communications, comprising the first component;

determining a threshold data structure characteristic based on the section characteristic;

comparing the first data structure characteristic to the threshold data structure characteristic; and applying the first data structure characteristic to the first component based on the first data structure characteristic corresponding to the threshold data structure characteristic.

5. The method of claim 2, further comprising:

comparing the first data content characteristic to the threshold data content characteristic; and applying the first data content characteristic to the first component based on the first data content characteristic corresponding to the threshold data content characteristic.

6. The method of claim 2, further comprising:

receiving a second selection, wherein the second selection comprises a second component for including in the set of communications, wherein the second component provides encapsulation of, and interoperability between, a second set of component elements, and wherein the second component corresponds to a second API;

receiving a sixth selection, wherein the sixth selection defines a second data content characteristic for the second component, wherein the second data content characteristic comprises a criterion for what data content is populated in the second component in the set of communications; and determining a second threshold data content characteristic based on the first data content characteristic;

comparing the second data content characteristic to the second threshold data content characteristic; and applying the second data content characteristic to the second component based on the second data content characteristic corresponding to the second threshold data content characteristic.

7. The method of claim 2, wherein each communication in the set of communications comprises a series of sections that defines a layout of the set of communications, and wherein each section of the series of sections is defined by a respective grid.

8. The method of claim 7, wherein the first data structure characteristic for the first component comprises a mapping of the first component to the respective grid of a section of the series of sections in which the first component is presented in the set of communications.

9. The method of claim 2, further comprising:

retrieving the first component from a library of available components; and retrieving the first API from a plurality of APIs, wherein each API of the plurality of APIs comprises a rendering engine specific to a respective component of the library of available components.

10. The method of claim 2, further comprising receiving a seventh selection, wherein the seventh selection defines a third data structure characteristic for the first component, wherein the third data structure characteristic comprises a criterion for what shape the first component is presented in the set of communications.

11. The method of claim 10, wherein the first selection, the third selection, the fourth selection, the fifth selection, and the seventh selection are received in a graphical user interface.

12. A non-transitory computer readable medium for generating electronic communications featuring consistent data structuring and dynamically-determined data content for transmission across computer networks for end user specific data in environments with data storage constraints, comprising instructions that, when executed by one or more processors, causes operations comprising:

receiving a first selection, wherein the first selection comprises a first component for including in in a set of communications, wherein the first component provides encapsulation of, and interoperability between, a first set of component elements, wherein the first component corresponds to a first application programming interface ("API");

receiving a third selection, wherein the third selection defines a first data structure characteristic for the first component, wherein the first data structure characteristic comprises a criterion for at least one of where the first component is presented in the set of communications and how the first component appears in the set of communication, and wherein the first data structure characteristic further comprises at least one of a layout, a format, and a graphical characteristic;

determining a threshold data content characteristic for the first component based on the first data structure characteristic for the first component;

receiving a fourth selection, wherein the fourth selection defines a first data content characteristic for the first component, wherein the first data content characteristic comprises a criterion for what data content is populated in the first component in the set of communications, wherein the first data content characteristic corresponds to the threshold data content characteristic, and wherein the threshold data content characteristic dynamically modifies presentation of data content in real-time or near real-time based on the data structure characteristic;

receiving a fifth selection, wherein the fifth selection requests generation of the set of communications, wherein the set of communications includes a first communication for a first end user and a second communication for a second end user;

populating, by the first API, the first component with first data content in the first communication by:

determining a first data source corresponding to the first end user;

retrieving available first data content from the first data source; and filtering the available first data content based on the first data content characteristic;

populating, by the first API, the first component with second data content in the second communication by:

determining a second data source of the plurality of data sources corresponding to the second end user;

retrieving available second data content from the second data source; and filtering the available second data content based on the first data content characteristic;

transmitting the first communication to the first end user, wherein the first data content is generated for display, on a first device corresponding to the first end user, in the first communication at a display location based on the first data structure characteristic; and transmitting the second communication to the second end user, wherein the first data content is generated for display, on a second device corresponding to the second end user, in the second communication at the display location based on the first data structure characteristic.

13. The non-transitory computer readable medium of claim 12, wherein the instructions further cause operations comprising receiving a second selection, wherein the second selection comprises a second component for including in the set of communications, wherein the second component provides encapsulation of, and interoperability between, a second set of component elements, and wherein the second component corresponds to a second API;

receiving a sixth selection, wherein the sixth selection defines a second data content characteristic for the second component, wherein the second data content characteristic comprises a criterion for what data content is populated in the second component in the set of communications; and populating, by the second API, the second component with second data content in the first communication by:

determining the first data source corresponding to the first end user;

retrieving available second data content from the first data source; and filtering the available second data content based on the second data content characteristic.

14. The non-transitory computer readable medium of claim 12, wherein the instructions further cause operations comprising:

determining a section characteristic for a section, in the set of communications, comprising the first component;

determining a threshold data structure characteristic based on the section characteristic;

comparing the first data structure characteristic to the threshold data structure characteristic; and applying the first data structure characteristic to the first component based on the first data structure characteristic corresponding to the threshold data structure characteristic.

15. The non-transitory computer readable medium of claim 12, wherein the instructions further cause operations comprising:

comparing the first data content characteristic to the threshold data content characteristic; and applying the first data content characteristic to the first component based on the first data content characteristic corresponding to the threshold data content characteristic.

16. The non-transitory computer readable medium of claim 12, wherein the instructions further cause operations comprising:

receiving a second selection, wherein the second selection comprises a second component for including in the set of communications, wherein the second component provides encapsulation of, and interoperability between, a second set of component elements, and wherein the second component corresponds to a second API;

receiving a sixth selection, wherein the sixth selection defines a second data content characteristic for the second component, wherein the second data content characteristic comprises a criterion for what data content is populated in the second component in the set of communications; and determining a second threshold data content characteristic based on the first data content characteristic;

comparing the second data content characteristic to the second threshold data content characteristic; and applying the second data content characteristic to the second component based on the second data content characteristic corresponding to the second threshold data content characteristic.

17. The non-transitory computer readable medium of claim 12, wherein each communication in the set of communications comprises a series of sections that defines a layout of the set of communications, and wherein each section of the series of sections is defined by a respective grid.

18. The non-transitory computer readable medium of claim 17, wherein the first data structure characteristic for the first component comprises a mapping of the first component to the respective grid of a section of the series of sections in which the first component is presented in the set of communications.

19. The non-transitory computer readable medium of claim 12, wherein the instructions further cause operations comprising:

retrieving the first component from a library of available components; and retrieving the first API from a plurality of APIs, wherein each API of the plurality of APIs comprises a rendering engine specific to a respective component of the library of available components.

20. The non-transitory computer readable medium of claim 12, wherein the instructions further cause operations comprising receiving a seventh selection, wherein the seventh selection defines a third data structure characteristic for the first component, wherein the third data structure characteristic comprises a criterion for what shape the first component is presented in the set of communications.

\* \* \* \* \*